(12) United States Patent
Miyazono

(10) Patent No.: US 8,873,046 B2
(45) Date of Patent: Oct. 28, 2014

(54) SPECTROSCOPIC DETECTION DEVICE AND CONFOCAL MICROSCOPE

(71) Applicant: Olympus Corporation, Tokyo (JP)

(72) Inventor: Yuya Miyazono, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/718,149

(22) Filed: Dec. 18, 2012

(65) Prior Publication Data

US 2013/0162982 A1 Jun. 27, 2013

(30) Foreign Application Priority Data

Dec. 22, 2011 (JP) ................. 2011-281556

(51) Int. Cl.
*G01J 3/28* (2006.01)

(52) U.S. Cl.
USPC ....................................... 356/326

(58) Field of Classification Search
USPC .................................. 356/326, 73
See application file for complete search history.

(56) References Cited

U.S. PATENT DOCUMENTS

| 7,817,271 | B2 | 10/2010 | Seyfried et al. | |
|---|---|---|---|---|
| 2009/0213362 | A1* | 8/2009 | Nakamura et al. | 356/72 |
| 2009/0236549 | A1 | 9/2009 | Vogt | |
| 2010/0294949 | A1 | 11/2010 | Sasaki et al. | |

FOREIGN PATENT DOCUMENTS

| EP | 2 253 983 A2 | 11/2010 |
| JP | 2006-010406 A | 1/2006 |
| JP | 2006-133345 A | 5/2006 |

OTHER PUBLICATIONS

Extended European Search Report (EESR) dated Mar. 15, 2013 (in English) issued in counterpart European Application No. 12197716.9.

* cited by examiner

*Primary Examiner* — Abdullahi Nur
(74) *Attorney, Agent, or Firm* — Holtz Holtz Goodman & Chick PC

(57) ABSTRACT

A spectroscopic detection device including: a stop in which an aperture is formed; a first and second photodetectors which detect detection light; a collimator which converts the detection light emitted from the stop into substantially parallel light, and emits light to at least one of the first and second photodetectors; a dispersive element which is arranged between the collimator and the first photodetector, and disperses the detection light; a condensing optical system which condenses the detection light dispersed by the dispersive element to the first photodetector; and a wavelength selection filter which is arranged between the collimator and the second photodetector, and allows light in a specified wavelength range to enter the second photodetector. The collimator is configured so that the focal length for the detection light emitted to the first photodetector may be different from the focal length for the detection light emitted to the second photodetector.

8 Claims, 3 Drawing Sheets

SPECTROSCOPIC DETECTION DEVICE AND CONFOCAL MICROSCOPE

CROSS REFERENCE TO RELATED APPLICATIONS

This application is based upon and claims the benefit of priority from prior Japanese Patent Application No. 2011-281556, filed Dec. 22, 2011, the entire contents of which are incorporated herein by this reference.

BACKGROUND OF THE INVENTION

1. Field of the Invention

The present invention is related to a spectroscopic detection device and a confocal microscope provided with the spectroscopic detection device, and more specifically to a spectroscopic detection device provided with a dispersive element as a spectroscopic device and an optical filter, and a confocal microscope provided with the spectroscopic detection device.

2. Description of the Related Art

At present, a spectroscopic device used for a spectroscopic detection device is roughly classified into a dispersive element such as a prism, a diffraction grating, etc. and a wavelength selection filter such as a dichroic filter (dichroic mirror), a barrier filter, etc.

The spectroscopic detection device using a dispersive element (hereafter referred to as a spectroscopic detection device in a dispersive element system) may perform multi-channel detection with a wavelength resolution higher than that of the spectroscopic detection device using a wavelength selection filter (hereafter referred to as a spectroscopic detection device in a filter system), and is capable of easily change the wavelength range to be detected. On the other hand, the spectroscopic detection device in a filter system may realize higher detection efficiency as compared with the spectroscopic detection device in the dispersive element system.

Thus, the spectroscopic detection device in the dispersive element system and the spectroscopic detection device in the filter system have different characteristics, and have different preferable systems depending on the observation target, purpose of use, etc. Therefore, a spectroscopic detection device capable of using these systems by switching them appropriately has been developed. The spectroscopic detection device is disclosed in, for example, Japanese Laid-open Patent Publication No. 2006-10406.

Japanese Laid-open Patent Publication No. 2006-10406 discloses a fluorescent detection device, and the fluorescent detection device is provided with a mobile drive device for moving a rotating drive mirror having a diffraction grating surface. According to the fluorescent detection device disclosed in Japanese Laid-open Patent Publication No. 2006-10406, by the mobile drive mechanism moving a rotating drive mirror, the dispersive element system and the filter system may be switched from and to each other.

The fluorescence detection device disclosed by Japanese Laid-open Patent Publication No. 2006-10406 has a configuration of selectively operating a rotating drive mirror having a diffraction grating surface or a wavelength selection filter for the light passed though a confocal stop and converted into parallel light by a collimator lens.

SUMMARY OF THE INVENTION

An aspect of the present invention provides a spectroscopic detection device including: a stop in which an aperture is formed and on which detection light is incident; a first photodetector which detects the detection light; a second photodetector which detects the detection light; a collimator which converts the detection light emitted from the stop into substantially parallel light, and emits light to at least one of the first photodetector and the second photodetector; a dispersive element which is arranged between the collimator and the first photodetector, and disperses the detection light; a condensing optical system which condenses the detection light dispersed by the dispersive element to the first photodetector; and a wavelength selection filter which is arranged between the collimator and the second photodetector, and allows light in a specified wavelength range to enter the second photodetector. The collimator is configured so that the focal length for the detection light emitted to the first photodetector may be different from the focal length for the detection light emitted to the second photodetector.

Another aspect of the present invention is a confocal microscope provided with the spectroscopic detection device according to the aspect above.

BRIEF DESCRIPTION OF THE DRAWINGS

The present invention will be more apparent from the following detailed description when the accompanying drawings are referenced.

DESCRIPTION OF THE EMBODIMENTS

Embodiment 1

Figure 1:
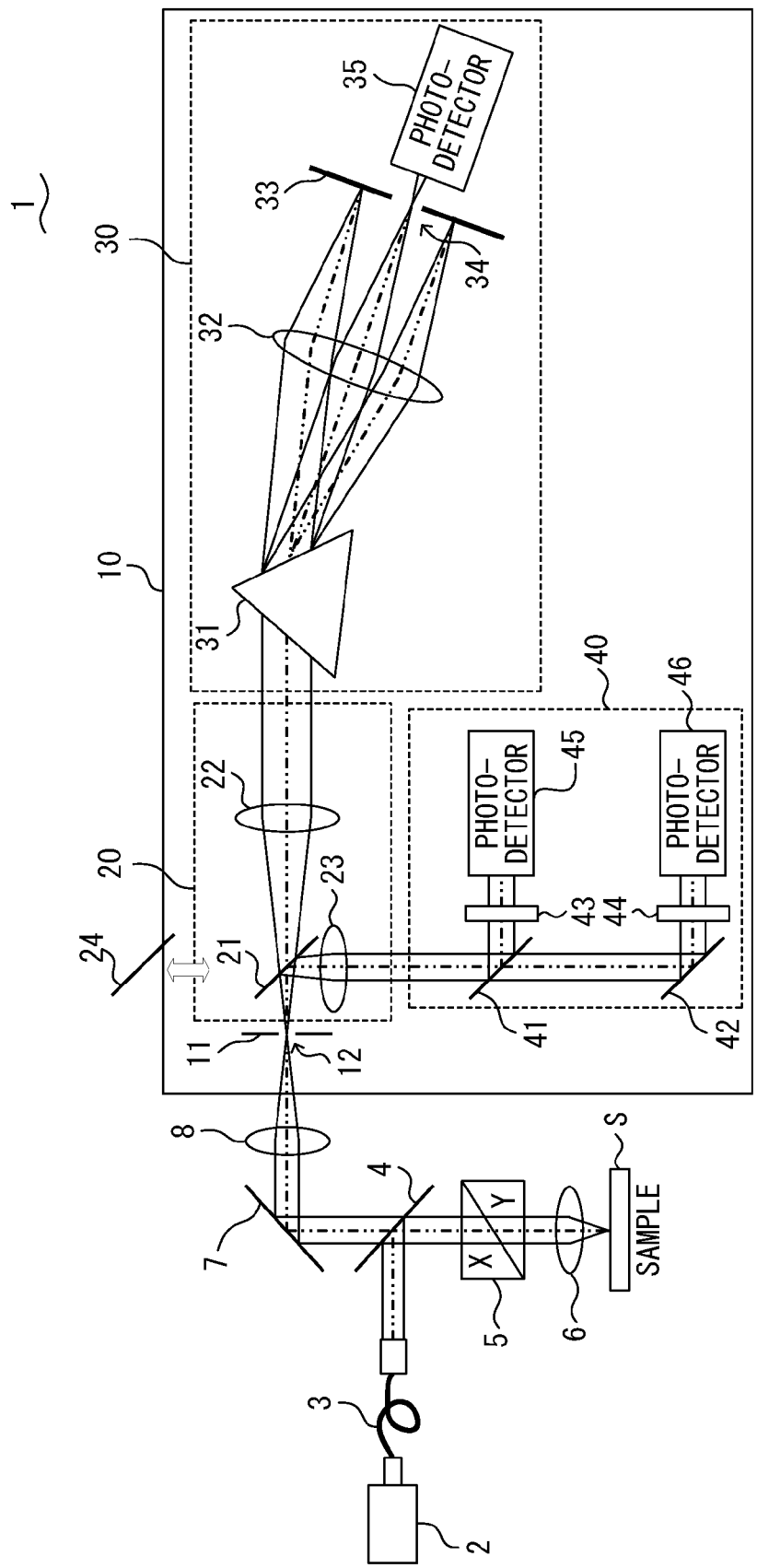
FIG. 1 exemplifies the configuration of a confocal microscope including the spectroscopic detection device according to an embodiment 1 of the present invention.

FIG. 1 exemplifies the configuration of a confocal microscope including the spectroscopic detection device according to the present embodiment. A confocal microscope 1 exemplified in FIG. 1 is a microscope provided with a spectroscopic detection device 10 which detects the detection light (for example, fluorescence) from a sample S irradiated with laser light simultaneously in the dispersive element system and the filter system.

The confocal microscope 1 includes: a laser light source 2 for emitting laser light; an optical fiber 3 connected to the laser light source 2; a dichroic mirror 4 which transmits detection light and reflects the laser light; an XY scanner 5 for scanning a sample S by the laser light in the direction orthogonal to the optical axis; an objective 6 irradiating the sample S with the laser light; a reflecting mirror 7 for reflecting the detection light toward the spectroscopic detection device 10; a confocal lens 8 for condensing the detection light reflected by the reflecting mirror 7; and a spectroscopic detection device 10.

The spectroscopic detection device 10 includes a confocal stop 11 in which a confocal pinhole 12 is formed; a collimator 20, a dispersion detection unit 30 as a first spectroscopic detector for detecting the detection light in the dispersive element system; and a filter detection unit 40 as a second spectroscopic detector for detecting the detection light in the filter system.

The confocal stop 11 is arranged near the back focal plane of the confocal lens 8 and receives the detection light.

The collimator 20 includes a dichroic mirror 21, a collimator lens 22, and a collimator lens 23, and is configured to convert the detection light emitted from the confocal stop 11 into substantially parallel light, and emit the light to at least one of the dispersion detection unit 30 and the filter detection unit 40.

The dichroic mirror 21 is an light splitting device for splitting the detection light into light received by the dispersion detection unit 30 and the light received by the filter detection unit 40 depending on the wavelength of the detection light.

The collimator lens 22 is arranged between the dichroic mirror 21 and the dispersion detection unit 30, and is configured to convert the detection light which has passed through the dichroic mirror 21 into substantially parallel light and emit the light toward the dispersion detection unit 30. That is, the collimator lens 22 is a first collimating optical unit for emitting the detection light as substantially parallel light toward the dispersion detection unit 30.

The collimator lens 23 is arranged between the dichroic mirror 21 and the filter detection unit 40 and is configured to convert the detection light which is reflected by the dichroic mirror 21 into substantially parallel light, and emit the light toward the filter detection unit 40. That is, the collimator lens 23 is a second collimating optical unit for emitting the detection light as substantially parallel light toward the filter detection unit 40.

The collimator lens 22 and the collimator lens 23 have different focal lengths. That is, the collimator 20 is configured to make the focal length for the detection light emitted to the dispersion detection unit 30 and the focal length for the detection light emitted to the filter detection unit 40 different from each other. Concretely, since focal length of the collimator lens 22 is longer than the focal length of the collimator lens 23, the collimator 20 is configured so that the focal length for the detection light emitted to the dispersion detection unit 30 may be longer than the focal length for the detection light emitted to the filter detection unit 40. As a result, the luminous flux diameter of the detection light emitted to the dispersion detection unit 30 is larger than the luminous flux diameter of the detection light emitted to the filter detection unit 40.

The dispersion detection unit 30 includes a prism 31 as a dispersive element for dispersing detection light (that is, splitting the light for each wavelength), a condenser 32 as an optical system for condensing the detection light dispersed by the prism 31, a slit plate 33 in which a slit 34 is formed, and a photodetector 35 of a single channel.

The slit plate 33 is arranged near the back focal plane of the condenser 32, and functions to limit the wavelength range of the detection light to be received by the photodetector 35. The slit plate 33 and the photodetector 35 function as the first photodetector for detecting the detection light dispersed by the prism 31. The condenser 32 is configured to condense the detection light to the first photodetector (to be more strict, the plane on which the slit plate 33 is arranged).

The filter detection unit 40 includes: a dichroic mirror 41 for splitting the detection light depending on the wavelength; a mirror 42 for reflecting the light which has passed through the dichroic mirror 41; a barrier filter 43 and a barrier filter 44 as a wavelength selection filter for splitting the light in a specified wavelength range from the detection light; and a photodetector 45 and a photodetector 46 as a second photodetector for detecting the detection light split by the wavelength selection filter.

The barrier filter 43 and the barrier filter 44 have different wavelength characteristics, and the barrier filter 43 is configured to receive the light of one specified wavelength range at the photodetector 45 and the barrier filter 44 is configured to receive the light of another specified wavelength range at the photodetector 46. The photodetector 45 and the photodetector 46 are photodetectors of a single channel.

The operation of the confocal microscope 1 configured as described above is described below.

The laser light emitted from the laser light source 2 and passed through the optical fiber 3 is reflected by the dichroic mirror 4. The laser light reflected by the dichroic mirror 4 enters the objective 6 through the XY scanner 5, and irradiates the sample S. By deflecting the laser light by the XY scanner 5, any portion of the sample S may be irradiated with the laser light. The detection light generated from the sample S by the irradiation of the laser light is converted by the objective 6 into a substantially parallel light, and is similarly deflected by the XY scanner 5 as with the laser light. Furthermore, the detection light which has passed through the XY scanner 5 is converted into the convergence light by the confocal lens 8 through which the light enters through the dichroic mirror 4 and the reflecting mirror 7, thereby entering the collimator 20.

In the detection light which has entered the collimator 20, the detection light from the portions other than the focal plane of the objective 6 is deleted by the confocal stop 11, and the detection light from the focal plane passes through the confocal stop 11. The detection light which has passed through the confocal stop 11 enters the collimator 20 as diffused light, thereby splitted by the dichroic mirror 21.

The detection light which has passed through the dichroic mirror 21 is converted by the collimator lens 22 into substantially parallel light, and enters the dispersion detection unit 30 from the collimator 20. The detection light which has entered the dispersion detection unit 30 is wavelength dispersed by the prism 31, and enters the condenser 32 at a different angle for each wavelength. The detection light which has entered at a different angle for each wavelength is condensed at a different position in the direction orthogonal to the optical axis of the condenser 32. Therefore, the detection light enters a different position on the slit plate 33. As a result, only the detection light which has entered at the position at which the slit 34 is formed in the slit plate 33 enters the photodetector 35 and detected.

Since the confocal pinhole 12 is projected on the slit plate 33 in the detection in the dispersive element system, a pinhole image having a different wavelength is formed at a different position on the slit plate 33. Therefore, if the projection magnification (focal length of the condenser 32/focal length of the collimator lens 22) of the image of the confocal pinhole 12 is too large, the images of the confocal pinhole 12 which are formed by the detection light having different wavelengths overlap each other on the slit plate 33.

In the spectroscopic detection device 10, the focal length of the condenser 32 depends on the prism 31 and the slit 34, and is not arbitrarily designed. However, the spectroscopic detection device 10 is configured so that the collimator lens 22 and the collimator lens 23 have different focal lengths, and the focal length of the collimator lens 22 is longer than the focal length of the collimator lens 23. Accordingly, the projection magnification of the image of the confocal pinhole 12 projected on the slit plate 33 maybe reduced, thereby realizing a higher wavelength resolution.

On the other hand, the detection light which has been reflected by the dichroic mirror 21 is converted into substantially parallel light by the collimator lens 23, and enters the filter detection unit 40 from the collimator 20. The detection light which has entered the filter detection unit 40 is split by the dichroic mirror 41 depending on the wavelength. The wavelength of the detection light which has been reflected by the dichroic mirror 41 is restricted by the barrier filter 43 which the detection light enters as substantially parallel light, and then the light is detected by the photodetector 45. The detection light which has passed through the dichroic mirror 41 is reflected by the mirror 42, and the wavelength of the light is restricted by the barrier filter 44 which the light enters as substantially parallel light. Then, the light is detected by the photodetector 46.

In the detection in the filter system, detection light enters the photodetector 45 and the photodetector 46 as parallel light. Therefore, if the luminous flux diameter of the parallel light is too large, the light is vignetted by a photodetector, thereby generating a loss of light quantity. In addition, the detection light similarly enters the optical elements (dichroic mirror 41, mirror 42, barrier filter 43, and barrier filter 44) between the collimator lens 23 and the photodetector as parallel light. Therefore, if the luminous flux diameter of the parallel light is too large, the light is also vignetted by these optical elements, thereby generating a loss of light quantity.

In the spectroscopic detection device 10, the collimator lens 22 and the collimator lens 23 are configured to have different focal lengths, and the focal length of the collimator lens 23 is shorter than the focal length of the collimator lens 22. Therefore, the luminous flux diameter of the detection light emitted from the collimator lens 23 may be smaller, thereby reducing the loss of light quantity and realizing high detection efficiency.

According to the spectroscopic detection device 10 and confocal microscope 1 of the present embodiment, different collimator lenses are used between the dispersive element system and the filter system. Therefore, collimator lenses of the respective optimal focal lengths may be used regardless of the restrictions in the respective systems. Therefore, the high wavelength resolution in the dispersive element system and the high detection efficiency in the filter system may be maintained.

In the example descriptions above, the collimator 20 has the dichroic mirror 21 as a light splitting device, it is not limited to the dichroic mirror 21 as a light splitting device. As a light splitting device, an arbitrary device for splitting detection light such as a half mirror, a deflection beam splitter, etc may be used instead of the dichroic mirror 21.

In addition, instead of the light splitting device, an optical path switching device for selectively leading the detection light to one of the dispersion detection unit 30 and the filter detection unit 40 may be included. Concretely, a mirror 24 which may be attached and detached with respect to the optical path or a rotatable mirror may be arranged instead of the dichroic mirror 21. In this case, by attaching, detaching, or rotating the mirror, the detection in the dispersive element system and the determination in the filter system may be switched from and to each other, and a similar effect as with the case using the dichroic mirror 21 may be acquired. That is, the collimator 20 may include an optical path forming device for leading the detection light to at least one of the dispersion detection unit 30 and the filter detection unit 40.

Embodiment 2

Figure 2:
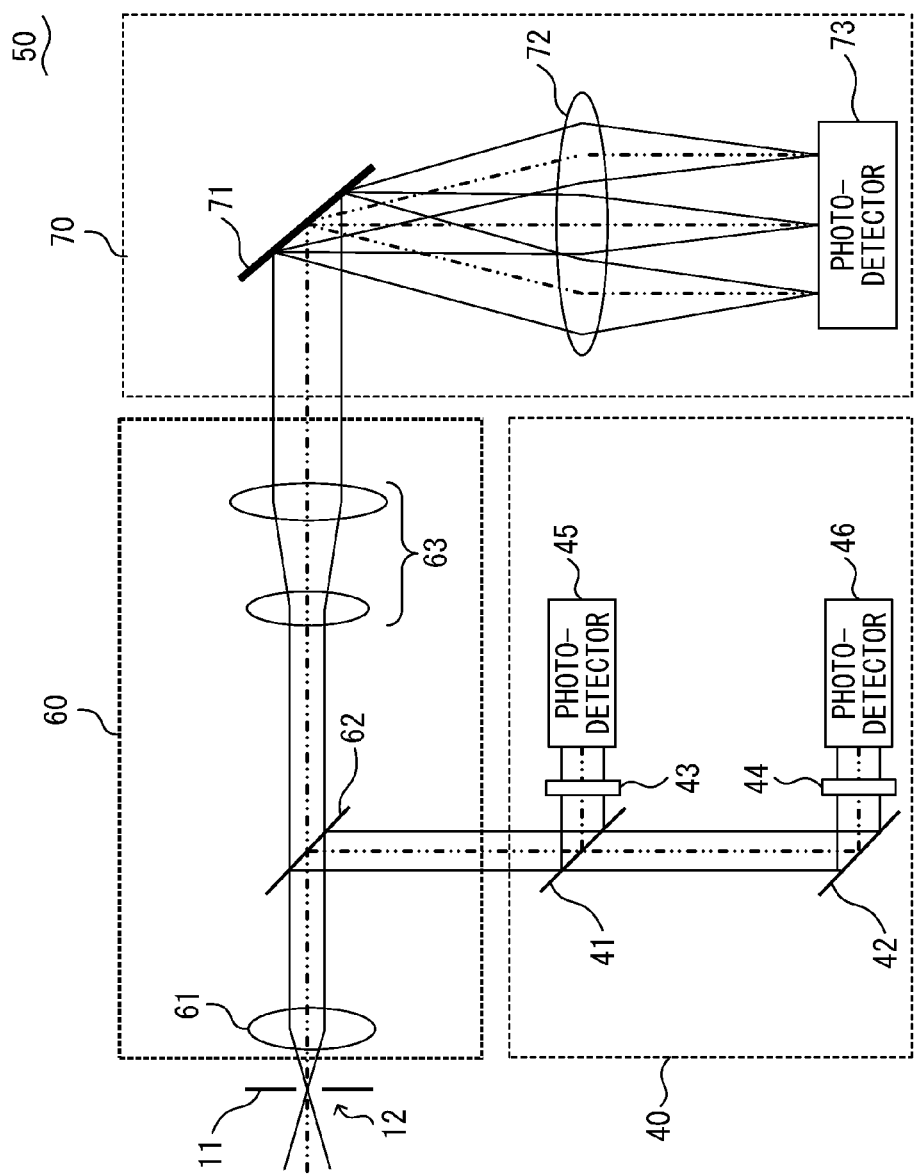
FIG. 2 exemplifies the configuration of a spectroscopic detection device according to an embodiment 2 of the present invention.

FIG. 2 exemplifies the configuration of a spectroscopic detection device according to the present embodiment. The confocal microscope according to the present embodiment is different from the confocal microscope 1 exemplified in FIG. 1 in that a spectroscopic detection device 50 is included instead of the spectroscopic detection device 10. Since other components are the same as those of the confocal microscope 1, only the spectroscopic detection device 50 is illustrated in FIG. 2.

The spectroscopic detection device 50 includes: a confocal stop 11 in which the confocal pinhole 12 is formed; a collimator 60; a dispersion detection unit 70 as a first spectroscopic detector for detecting the detection light in the dispersive element system; and the filter detection unit 40 as the second spectroscopic detector for detecting the detection light in the filter system. The spectroscopic detection device 50 is different from the spectroscopic detection device 10 according to the embodiment 1 exemplified in FIG. 1 in that the spectroscopic detection device 50 includes the collimator 60 instead of the collimator 20 and the dispersion detection unit 70 instead of the dispersion detection unit 30. Since the confocal stop 11 and the filter detection unit 40 are similar to those in the spectroscopic detection device 10, the similar components are assigned the same reference numerals and the explanation is omitted here.

The collimator 60 includes a collimator lens 61, a dichroic mirror 62, and a variable magnification optical system 63, and is configured to convert the detection light emitted from the confocal stop 11 and emit the converted light to at least one of the dispersion detection unit 70 and the filter detection unit 40.

The collimator lens 61 is arranged between the dichroic mirror 62 and the confocal stop 11, and is configured to convert the detection light which has passed through the confocal stop 11 into substantially parallel light.

The dichroic mirror 62 is a light splitting device for splitting the detection light depending on the wavelength of the detection light into the light to be received by the dispersion detection unit 70 and the light to be received by the filter detection unit 40.

The variable magnification optical system 63 is a variable magnification optical system which is arranged between the dichroic mirror 62 and the dispersion detection unit 70, and changes the luminous flux diameter of the detection light as substantially parallel light which has passed through the dichroic mirror 62.

In the collimator 60, the combination of the collimator lens 61 and the variable magnification optical system 63 functions as the first collimating optical unit for emitting the detection light as substantially parallel light to the dispersion detection unit 70, and the collimator lens 61 as a single unit functions as the second collimating optical unit for emitting the detection light as substantially parallel light to the filter detection unit 40.

The combined focal length of the collimator lens 61 and the variable magnification optical system 63 is different from the focal length of the collimator lens 61 as a single unit. That is, the collimator 60 is configured so that the focal length for the detection light emitted to the dispersion detection unit 70 is different from the focal length for the detection light emitted to the filter detection unit 40. Concretely, since the focal length of the collimator lens 61 is shorter than the focal length of the combination of the collimator lens 61 and the variable magnification optical system 63, the collimator 60 is configured so that the focal length for the detection light emitted to the dispersion detection unit 70 is longer than the focal length for the detection light emitted to the filter detection unit 40. As a result, the luminous flux diameter of the detection light emitted to the dispersion detection unit 70 is larger than the luminous flux diameter of the detection light emitted from the filter detection unit 40.

The dispersion detection unit 70 includes: a diffraction grating 71 as a dispersive element which disperses (that is, splits for each wavelength) detection light; a condenser 72 as an optical system for condensing the detection light dispersed by the diffraction grating 71 to a photodetector 73; and a multichannel photodetector 73.

The photodetector 73 is arranged near the back focal plane of the condenser 72, and functions as the first photodetector for detecting the detection light dispersed by the diffraction grating 71.

In the detection in the dispersive element system, since the confocal pinhole 12 is projected to the photodetector 73, the detection light of each wavelength is condensed in the range of the image of the confocal pinhole 12 projected on the photodetector 73 with the different positions on the photodetector 73 centered. Therefore, if the projection magnification (focal length of the condenser 72/combined focal length of the collimator lens 61 and the variable magnification optical system 63) of the image of the confocal pinhole 12 is too large, the images of the confocal pinhole 12 formed by the detection light having different wavelengths overlap each other on the photodetector 73. That is, the light of plural wavelengths is detected on each channel of the photodetector 73. Therefore, as with the spectroscopic detection device 10 according to the embodiment 1, the wavelength resolution for the detection in the dispersive element system depends on the projection magnification of the image of the confocal pinhole 12 in the spectroscopic detection device 50.

In the spectroscopic detection device 50, the combined focal length of the collimator lens 61 and the variable magnification optical system 63 is different from the focal length of the collimator lens 61 as a single unit, and the combined focal length is longer than the focal length of the collimator lens 61 as a single unit. Therefore, the projection magnification of the image of the confocal pinhole 12 projected on the photodetector 73 may be reduced, thereby realizing a high wavelength resolution.

The detection in the filter system is similar to the detection by the spectroscopic detection device 10 according to the embodiment 1. The spectroscopic detection device 50 is configured so that the combined focal length of the collimator lens 61 and the variable magnification optical system 63 is different from the focal length of the collimator lens 61 as a single unit, and the focal length of the collimator lens 61 as a single unit is shorter than the combined focal length. Therefore, the luminous flux diameter of the detection light emitted to the filter detection unit 40 may be smaller, thereby realizing high detection efficiency with a reduced loss of light quantity.

According to the spectroscopic detection device 50 and the confocal microscope according to the present embodiment, as with the spectroscopic detection device 10 and the confocal microscope 1 according to the embodiment 1, a high wavelength resolution in the dispersive element system and the high detection efficiency in the filter system may be compatible.

In addition, in the spectroscopic detection device 50, the detection light entering the dichroic mirror 62 as a light splitting device is parallel light. Therefore, as compared with the collimator 20 which receives detection light as diffused light, the generation of the aberration may be suppressed on the light splitting device, thereby making compatible at a high level the high wavelength resolution and the high detection efficiency.

The spectroscopic detection device 50 is similar to the spectroscopic detection device 10 according to the embodiment 1 in that the light splitting device is not limited to the dichroic mirror 62, and may include an optical path switch device instead of the light splitting device. In addition, the spectroscopic detection device 50 may include the dispersion detection unit 30 exemplified in FIG. 1 instead of the dispersion detection unit 70. Similarly, the spectroscopic detection device 10 according to the embodiment 1 may include the dispersion detection unit 70 instead of the dispersion detection unit 30.

Embodiment 3

Figure 3:
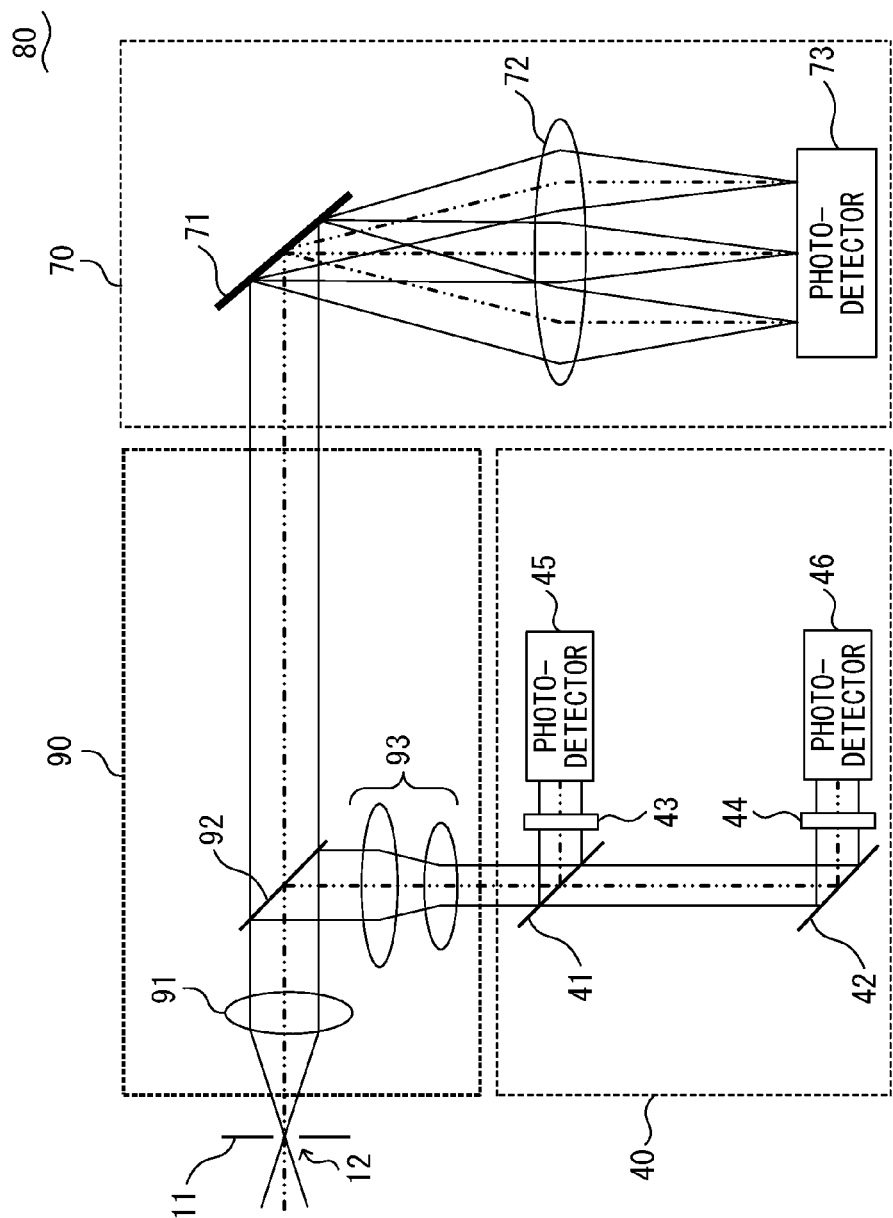
FIG. 3 exemplifies the configuration of a spectroscopic detection device according to an embodiment 3 of the present invention.

FIG. 3 exemplifies the configuration of a spectroscopic detection device according to the present embodiment. The confocal microscope according to the present embodiment is different from the confocal microscope according to the embodiment 2 in that a spectroscopic detection device 80 is included instead of the spectroscopic detection device 50.

The spectroscopic detection device 80 includes: the confocal stop 11 in which the confocal pinhole 12 is formed; a collimator 90, a dispersion detection unit 70 as the first spectroscopic detector for detecting detection light in the dispersive element system; and the filter detection unit 40 as the second spectroscopic detector for detecting the detection light in the filter system. The spectroscopic detection device 80 is different from the spectroscopic detection device 50 according to the embodiment 2 exemplified in FIG. 2 in that the collimator 90 is included instead of the collimator 60. Since the confocal stop 11, the filter detection unit 40, and the dispersion detection unit 70 are similar to those of the spectroscopic detection device 50, the components are assigned the same reference numerals, and the explanation is omitted here.

The collimator 90 includes a collimator lens 91, a dichroic mirror 92, and a variable magnification optical system 93, and is configured to convert the detection light emitted from the confocal stop 11 into substantially parallel light, and emit the light to at least one of the dispersion detection unit 70 and the filter detection unit 40.

The collimator lens 91 is arranged between the dichroic mirror 92 and the confocal stop 11, and is configured to convert the detection light which has passed through the confocal stop 11 into substantially parallel light.

The dichroic mirror 92 is a light splitting device which splits the detection light depending on the wavelength of the detection light into the light which is received by the dispersion detection unit 70, and the detection light which is received by the filter detection unit 40.

The variable magnification optical system 93 is a variable magnification optical system which is arranged between the dichroic mirror 92 and the filter detection unit 40, and changes the luminous flux diameter of the detection light as substantially parallel light which has reflected by the dichroic mirror 92.

In the collimator 90, the collimator lens 91 as a single unit functions as the first collimating optical unit for emitting the detection light as substantially parallel light to the dispersion detection unit 70, and the combination of the collimator lens 91 and the variable magnification optical system 93 functions as the second collimating optical unit for emitting the detection light as substantially parallel light to the filter detection unit 40.

The combined focal length of the collimator lens 91 and the variable magnification optical system 93 is different from the focal length of the collimator lens 91 as a single unit. That is, the collimator 90 is configured so that the focal length for the detection light emitted to the dispersion detection unit 70 is different from the focal length for the detection light emitted to the filter detection unit 40. Concretely, since the focal length of the collimator lens 91 is longer than the combined focal length of the collimator lens 91 and the variable magnification optical system 93, the collimator 90 is configured so that the focal length for the detection light emitted to the dispersion detection unit 70 is longer than the focal length for the detection light emitted to the filter detection unit 40. As a result, the luminous flux diameter of the detection light emitted to the dispersion detection unit 70 is larger than the luminous flux diameter of the detection light emitted to the filter detection unit 40.

Therefore, according to the spectroscopic detection device 80 and the confocal microscope of the present embodiment, as with the spectroscopic detection device 10 and the confocal microscope 1 according to the embodiment 1 and the spectroscopic detection device 50 and the confocal microscope according to the embodiment 2, a high wavelength resolution in the dispersive element system and a high detection efficiency in the filter system may be compatible.

Also in the spectroscopic detection device 80, the detection light which enters the dichroic mirror 92 as a light splitting device is parallel light. Therefore, for the reasons as with the spectroscopic detection device 50, the high wavelength resolution and the high detection efficiency may be compatible at a high level.

The spectroscopic detection device 80 is similar to the spectroscopic detection device according to the first and the second embodiments in that the light splitting device is not limited to the dichroic mirror 92 and an optical path switch device may be included instead of the light splitting device. Furthermore, the spectroscopic detection device 80 is similar to the spectroscopic detection device 50 according to the second embodiment in that the dispersion detection unit 30 exemplified in FIG. 1 may be included instead of the dispersion detection unit 70.

What is claimed is:

1. A spectroscopic detection device comprising:
a stop in which an aperture is formed and on which detection light is incident;
a first photodetector which detects the detection light;
a second photodetector which detects the detection light;
a collimator which converts the detection light emitted from the stop into substantially parallel light, and emits light to at least one of the first photodetector and the second photodetector;
a dispersive element which is arranged between the collimator and the first photodetector, and disperses the detection light;
a condensing optical system which condenses the detection light dispersed by the dispersive element to the first photodetector; and
a wavelength selection filter which is arranged between the collimator and the second photodetector, and allows light in a specified wavelength range to enter the second photodetector,
wherein:
the collimator is configured so that a focal length for the detection light emitted to the first photodetector is longer than a focal length for the detection light emitted to the second photodetector,
the collimator comprises:
an optical path forming device which leads the detection light to at least one of the first photodetector and the second photodetector;
a collimator lens which is arranged between the optical path forming device and the stop, and converts the detection light which has passed through the stop into substantially parallel light; and
a variable magnification optical system which is arranged between the optical path forming device and the first photodetector, and changes a luminous flux diameter of the detection light as substantially parallel light which has passed through the optical path forming device; and
a focal length of the collimator lens is shorter than a combined focal length of the collimator lens and the variable magnification optical system.

2. The device according to claim 1, wherein the optical path forming device is a light splitting device which splits the detection light into light to be received by the first photodetector and light to be received by the second photodetector.

3. The device according to claim 1, wherein the optical path forming device is an optical path switch device which selectively leads the detection light to at least one of the first photodetector and the second photodetector.

4. A spectroscopic detection device comprising:
a stop in which an aperture is formed and on which detection light is incident;
a first photodetector which detects the detection light;
a second photodetector which detects the detection light;
a collimator which converts the detection light emitted from the stop into substantially parallel light, and emits light to at least one of the first photodetector and the second photodetector;
a dispersive element which is arranged between the collimator and the first photodetector, and disperses the detection light;
a condensing optical system which condenses the detection light dispersed by the dispersive element to the first photodetector; and
a wavelength selection filter which is arranged between the collimator and the second photodetector, and allows light in a specified wavelength range to enter the second photodetector,
wherein:
the collimator is configured so that a focal length for the detection light emitted to the first photodetector is longer than a focal length for the detection light emitted to the second photodetector,
the collimator comprises:
an optical path forming device which leads the detection light to at least one of the first photodetector and the second photodetector;
a collimator lens which is arranged between the optical path forming device and the stop, and converts the detection light which has passed through the stop into substantially parallel light; and
a variable magnification optical system which is arranged between the optical path forming device and the second photodetector, and changes a luminous flux diameter of the detection light as substantially parallel light which has passed through the optical path forming device; and
a focal length of the collimator lens is longer than a combined focal length of the collimator lens and the variable magnification optical system.

5. The device according to claim 4, wherein the optical path forming device is a light splitting device which splits the detection light into light to be received by the first photodetector and light to be received by the second photodetector.

6. The device according to claim 4, wherein the optical path forming device is an optical path switch device which selectively leads the detection light to at least one of the first photodetector and the second photodetector.

7. A confocal microscope comprising:
a spectroscopic detection device,
wherein the spectroscopic detection device comprises:
- a confocal stop in which an aperture is formed and on which detection light is incident;
- a first photodetector which detects the detection light;
- a second photodetector which detects the detection light;
- a collimator which converts the detection light emitted from the confocal stop into substantially parallel light, and emits light to at least one of the first photodetector and the second photodetector;
- a dispersive element which is arranged between the collimator and the first photodetector, and disperses the detection light;
- a condensing optical system which condenses the detection light dispersed by the dispersive element to the first photodetector; and
- a wavelength selection filter which is arranged between the collimator and the second photodetector, and allows light in a specified wavelength range to enter the second photodetector, wherein:
the collimator is configured so that a focal length for the detection light emitted to the first photodetector is longer than a focal length for the detection light emitted to the second photodetector,
the collimator comprises:
- an optical path forming device which leads the detection light to at least one of the first photodetector and the second photodetector;
- a collimator lens which is arranged between the optical path forming device and the confocal stop, and converts the detection light which has passed through the confocal stop into substantially parallel light; and
- a variable magnification optical system which is arranged between the optical path forming device and the first photodetector, and changes a luminous flux diameter of the detection light as substantially parallel light which has passed through the optical path forming device; and a focal length of the collimator lens is shorter than a combined focal length of the collimator lens and the variable magnification optical system.

8. A confocal microscope comprising:
a spectroscopic detection device,
wherein the spectroscopic detection device comprises:
- a confocal stop in which an aperture is formed and on which detection light is incident;
- a first photodetector which detects the detection light;
- a second photodetector which detects the detection light;
- a collimator which converts the detection light emitted from the confocal stop into substantially parallel light, and emits light to at least one of the first photodetector and the second photodetector;
- a dispersive element which is arranged between the collimator and the first photodetector, and disperses the detection light;
- a condensing optical system which condenses the detection light dispersed by the dispersive element to the first photodetector; and
- a wavelength selection filter which is arranged between the collimator and the second photodetector, and allows light in a specified wavelength range to enter the second photodetector, wherein:
the collimator is configured so that a focal length for the detection light emitted to the first photodetector is longer than a focal length for the detection light emitted to the second photodetector,
the collimator comprises:
- an optical path forming device which leads the detection light to at least one of the first photodetector and the second photodetector;
- a collimator lens which is arranged between the optical path forming device and the confocal stop, and converts the detection light which has passed through the confocal stop into substantially parallel light; and
- a variable magnification optical system which is arranged between the optical path forming device and the second photodetector, and changes a luminous flux diameter of the detection light as substantially parallel light which has passed through the optical path forming device; and a focal length of the collimator lens is longer than a combined focal length of the collimator lens and the variable magnification optical system.

* * * * *